(No Model.)

J. A. BARRETT.

CONDUIT FOR SUBTERRANEAN ELECTRICAL CONDUCTORS.

No. 332,319.                    Patented Dec. 15, 1885.

WITNESSES
Ed. A. Newman,
Al. C. Newman.

INVENTOR
John A. Barrett
By his Attorneys
Baldwin Hopkins & Peyton (No Model.)  4 Sheets—Sheet 2.

J. A. BARRETT.
CONDUIT FOR SUBTERRANEAN ELECTRICAL CONDUCTORS.

No. 332,319. Patented Dec. 15, 1885.

WITNESSES
Ed. A. Newman
Al. C. Newman

INVENTOR
John A. Barrett
By his Attorneys
Baldwin Hopkins & Peyton (No Model.)

J. A. BARRETT.

CONDUIT FOR SUBTERRANEAN ELECTRICAL CONDUCTORS.

No. 332,319. Patented Dec. 15, 1885.

WITNESSES

INVENTOR
John A. Barrett
By his Attorneys (No Model.)

J. A. BARRETT.

CONDUIT FOR SUBTERRANEAN ELECTRICAL CONDUCTORS.

No. 332,319. Patented Dec. 15, 1885.

WITNESSES
Ed. A. Newman.
Al. C. Newman.

INVENTOR
John A. Barrett
By his Attorneys
Baldwin Hopkins & Peyton

UNITED STATES PATENT OFFICE.

JOHN A. BARRETT, OF BROOKLYN, NEW YORK.

CONDUIT FOR SUBTERRANEAN ELECTRICAL CONDUCTORS.

SPECIFICATION forming part of Letters Patent No. 332,319, dated December 15, 1885.

Application filed December 6, 1884. Serial No. 149,658. (No model.)

*To all whom it may concern:*

Be it known that I, JOHN A. BARRETT, a citizen of the United States, residing at Brooklyn, in the county of Kings and State of New York, have invented certain new and useful Improvements in Conduits for Subterranean Electric Conductors, of which improvements the following is a specification.

My invention relates to that class of electric conductors which are grouped in tubes or conduits provided with working-chambers for manipulating the wires.

The object of the first part of my invention is to render the conductors easy of manipulation, while protecting them from unauthorized interference, which end I attain by interposing in the main-line conduit, whenever it is desired to have access to the wires, a transfer-pipe or test-box, through which the conductors are passed, the transfer-pipe being deflected out of the line of the conduit and joined to it by coupling-boxes (having removable caps) so arranged as to enable the wires to be drawn into and out of the conduit in (as nearly as possible) a straight line.

The object of the next part of my invention is to render all the conductors contained in a group of conduits accessible by a single transfer-pipe, which end I attain by joining the single transfer-pipe to the group by means of a coupling-box common to all of the conduits.

The objects of the next part of my invention are so to arrange a large number of wires that those belonging to any one group may be securely sealed from improper interference, and yet be readily accessible when desired, without disarranging or disturbing the conductors of the other group. I secure the wires from interference by providing each group with its own transfer-pipe and coupling-boxes having removable caps or covers, which may be securely locked or sealed. The ability to manipulate the wires of either group without disarranging those of the others is attained by so organizing the conduits, coupling-boxes, transfer-pipes, and test-boxes that access may readily be had to the wires at each coupling-box, transfer-pipe, or test-box without obstruction from or interference with the other parts of the apparatus.

The subject-matter claimed is hereinafter particularly specified at the end of this specification.

The accompanying drawings represent a complete system of underground conductors adapted for all the various requirements of a large city, such as burglar-alarms, fire-alarms, electric-lighting, telegraphic, telephonic, and other purposes.

Obviously some of the improvements may be used without the others, and the details of construction shown may be varied within certain limits, without departing from the spirit of my invention, and such modifications would readily suggest themselves to a skillful electric engineer on examining this specification.

Figure 1 represents a plan or top view of a complete system of coupling-boxes, test-boxes, transfer-pipes, and conduits inclosed in a working-chamber; Fig. 2, a vertical central section therethrough on the line 2 2 of Fig. 1. Fig. 3 represents a sectional perspective view of two coupling-boxes and their connecting transfer-pipe; Fig. 4, a similar view showing several conduits terminating in common connection-boxes with a single connecting transfer-pipe and test-box. Fig. 5 represents a vertical central section through one of the coupling-boxes, showing its details of construction and a method of connecting the ends of the wires. Fig. 6 represents a transverse vertical section through a group of main-line conduits; and Fig. 7, a perspective view showing my improved system adapted for use in a chamber, conduit, or tunnel by applying the conduits, coupling-boxes, test-boxes, and transfer-boxes to its side walls.

I use herein the term "main-line conduit" to designate the pipes through which the conductors pass from one working-chamber or test-box to another. The term "coupling-box" I apply to the boxes in which these main-line conduits terminate. The term "transfer-pipe" I apply to the conduit (which transfer-pipe in some cases contains a test-box) which unites the two coupling-boxes. The term "working-chamber" I apply to that portion of the conduit which contains the coupling-boxes, test-boxes, and transfer-pipes, whether such chamber be a closed chamber or a space in a tunnel.

In the drawings the transfer-pipe is shown as consisting of a pipe having in some cases a test-box with a removable cover in some portion of its length. The whole transfer-pipe might, however, be made in sections to permit of the ready removal or displacement of its parts, as is well understood. This pipe forms a continuation of the conduit, though in a different plane or line.

As my invention consists in certain novel combinations of instrumentalities, it is unimportant to describe in detail the construction of the various parts of the apparatus, such being well known, unless otherwise hereinafter specified; but, so far as I am aware, the organizations hereinafter claimed are novel with me.

In order to carry out my improved system to the best advantage, I provide a series of working-chambers, A, of similar construction at suitable distances apart, one only, however, being shown in the drawings. A drip-shield, A', and waste-pipe are shown in the drawings in addition to the usual cover. These chambers are connected by conduits or pipes B, through which conductors C, preferably insulated, are passed. The conductors of each conduit preferably constitute a group of which all the wires are used for similar purposes—that is, the wires for telephonic, telegraphic, or electric-lighting purposes are each preferably grouped in its own conduit. Each conduit terminates in a coupling-box provided with a removable end, cap, or cover to render the wires readily accessible. This cover may be provided with a suitable lock or seal to prevent unauthorized interferences. The ends of the wires which terminate in these connection-boxes may be united in various well-known ways.

Figure 1:
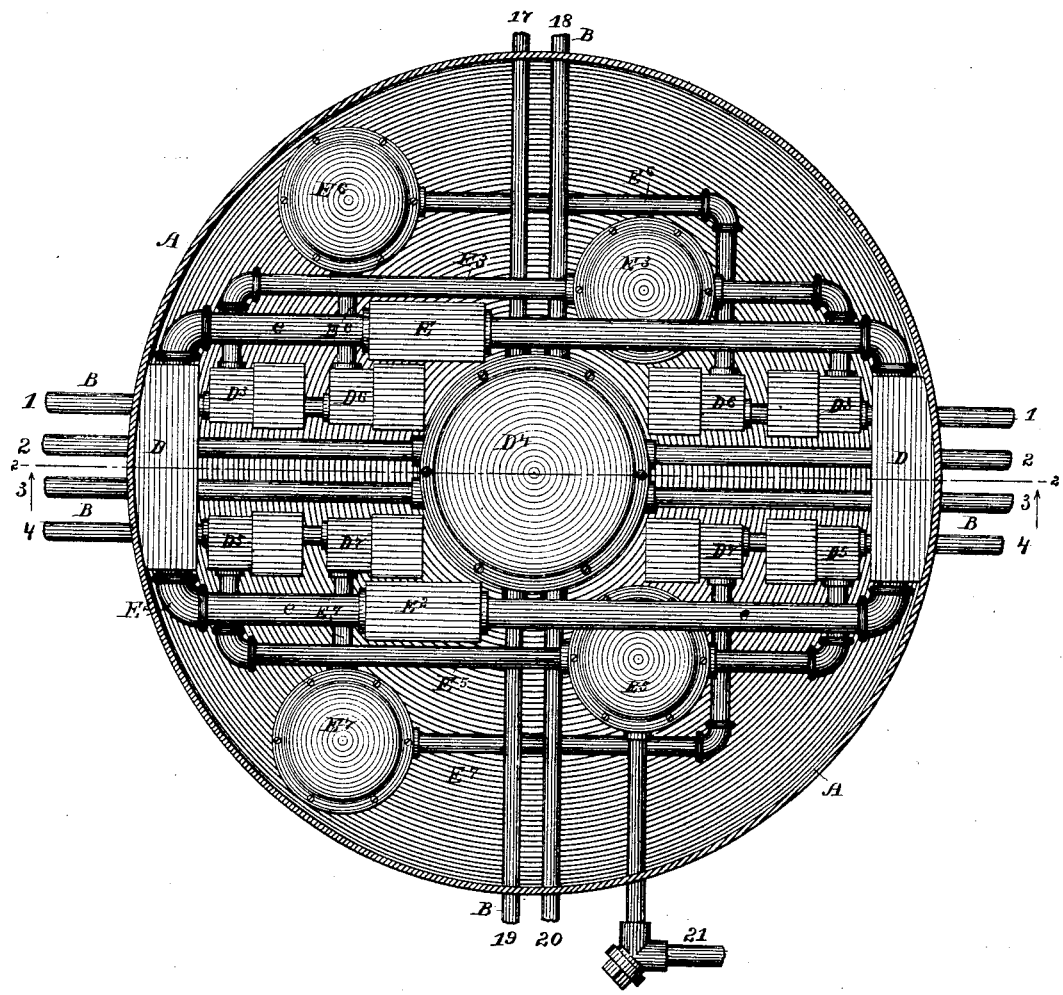
Figure 5:
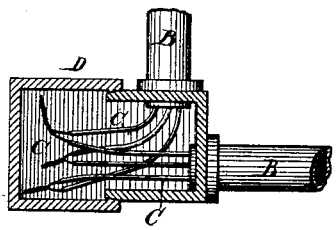
Figure 2:
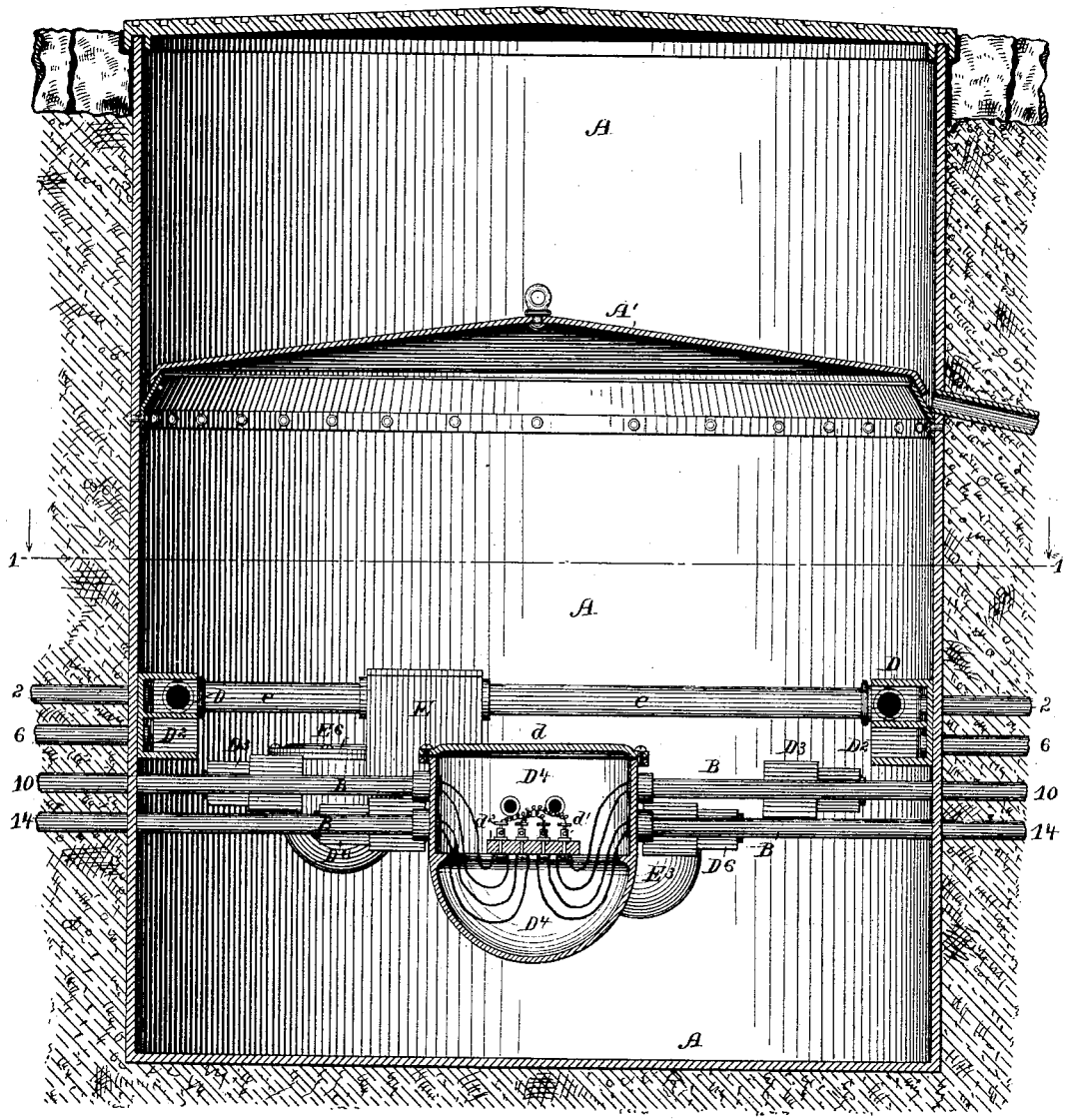
Figure 6:
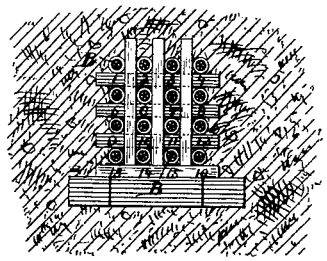
Figure 4:
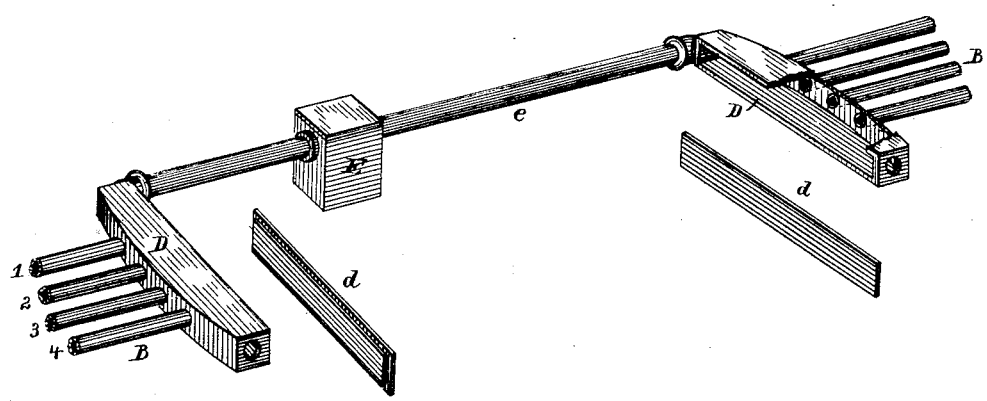
Fig. 4 represents two coupling-boxes, in each of which a series of conduits terminate, the coupling-boxes being united by a single transfer-pipe, in which a test-box is included.
Figure 3:
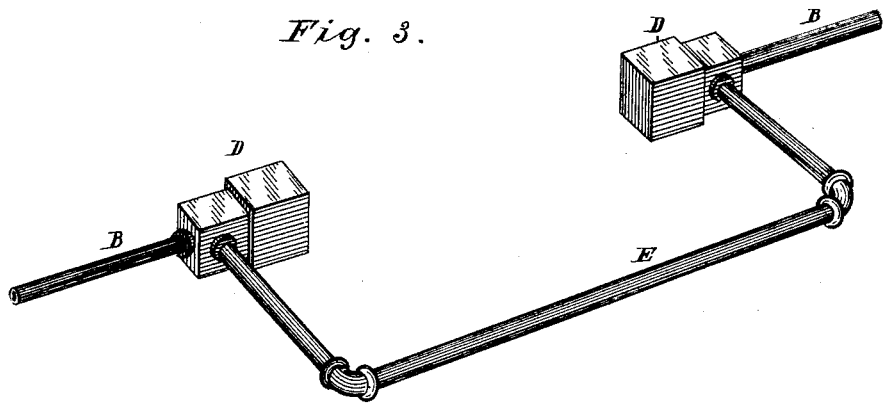
Fig. 3 shows a transfer-pipe interposed in a main-line conduit and joined to it by two coupling-boxes. The transfer-pipe is deflected to one side, so as to leave room between the boxes for the workman to have free access to them.
Figure 7:
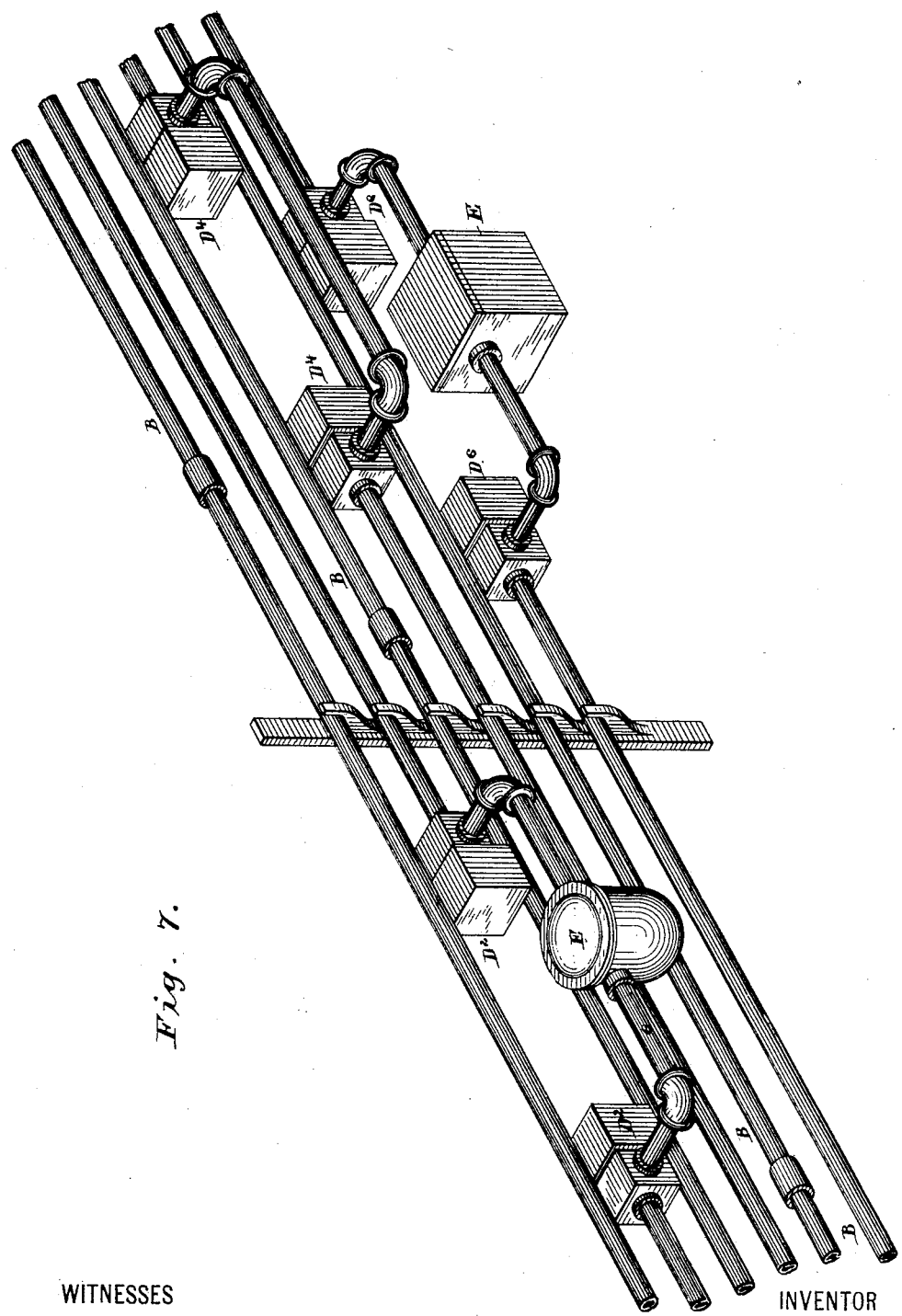

Figs. 1, 2, and 7 show a large number of conduits with their coupling-boxes, test-boxes, and transfer-pipes all contained in one chamber.

Where a number of groups of wires lead into a common working-chamber—as in these last-mentioned figures—a special organization becomes necessary to permit of each group of wires being readily manipulated. This is done, as shown in these figures, by providing each conduit or group of conduits with separate coupling-boxes on opposite sides of the working-chamber, and connecting each set of coupling-boxes by special transfer-pipes.

Figs. 1 and 2 represent an organization adapted for sixteen groups of wires, consisting of, say, fifteen wires in each group, thus providing a number large enough for the various purposes desired. Each set of transfer-pipes, it will be observed, is so arranged as to be readily accessible, so that the operator can get a straight pull on the wires, which experience has shown to be necessary.

In Figs. 1 and 2 four of the conduits, 10 11 14 15, are shown as terminating in a central coupling-box, $D^4$, their wires being connected by binding-posts $d'$ on a connection-board, $d^2$. The connection-board, it will be observed, is arranged below the plane of the conduits, so as to leave an unobstructed space to enable the wires to be pulled straight in and out of the pipes. The transfer-pipes pass around this coupling-box, so as to afford free access to it. Branch pipes 17 18 19 20 are also shown as leading from this central coupling-box. Similar branches may also be led from any of the transfer-pipes or test-boxes—as, for instance, pipe 21 from test-box $E^5$—though omitted from the drawings in the other instances for the sake of simplicity. Four of the conduits, 1 2 3 4—being the upper row—are shown as terminating in the same coupling-box, D, and connecting with transfer-pipe $e$ and test-box E, which arrangement enables me to consolidate the four groups of conductors contained therein into one group. The ends of the wires are threaded through the transfer-pipes, or spliced to short wires previously so threaded into said pipes and connected as desired. Where test-boxes are included in the transfer-pipes, the wires may be united in usual ways to facilitate testing. The second row of conduits, 5 6 7 8, terminate in a similar coupling-box, $D^2$, Fig. 2, and are similarly connected with the transfer-pipe $E^2$. This transfer-pipe is shown on the opposite side of the one conveying the upper group of conductors, 1 2 3 4, Fig. 2. The two outer groups, 9 and 12, of the third row of conductors enter their respective connection-boxes, $D^3$ $D^5$, each leading through its respective transfer-pipe and test-box $E^3$ $E^5$ to the corresponding coupling-box and conduit on the opposite side of the working-chamber. The wires of the remaining conduits, 13 and 16, being those on the outer lower corners of the group, are similarly connected with their respective coupling-boxes $D^6$ $D^7$, transfer-pipes, and test-boxes $E^6$ $E^7$, on a lower level and in a different location, which leaves unobstructed access to them.

I have described the transfer-pipes and coupling-boxes as arranged in a working-chamber so as to afford access to them from above. Obviously the apparatus might be arranged vertically—that is to say, on the wall of a tunnel or conduit—so as to afford access to them in a horizontal direction, or, in other words, simply to turn the working-chamber and its contents on its side, as shown in Fig. 7.

I claim as my invention—

1. The combination, substantially as herein set forth, of a main-line conduit, two closed coupling-boxes (with removable caps) interposed in said conduit, a transfer-pipe uniting the coupling-boxes, and electrical conductors passing through said conduit, coupling-boxes, and transfer-pipe to render the conductors easy of manipulation, while protecting them from unauthorized interference.

2. The combination, substantially as herein set forth, of a series or group of main-line conduits, two closed coupling-boxes (with removable caps) interposed in said conduits and common to all of them, a transfer-pipe uniting the coupling-boxes, and electrical conductors passing through said conduits, coupling-boxes, and transfer-pipes, so as to render all the conductors of the various conduits accessible from a single coupling-box.

3. The combination, substantially as herein set forth, of a working-chamber, a series or group of main-line conduits connected therewith, a series of closed coupling-boxes (with removable caps) interposed in said conduits within said working-chamber, a transfer-pipe uniting each pair of coupling-boxes, and electrical conductors passing through said conduits, coupling-boxes, and transfer-pipes, these members being organized as described to permit easy manipulation of each group of conductors without disturbing the others, while each group is protected from unauthorized interference.

4. The combination, substantially as set forth, of several separate conduits or groups of conduits, (each containing a distinct class of wires,) with transfer-pipes connected laterally with the conduit or conduits, or at the side or sides thereof, and forming closed continuations of the respective conduits united by them.

5. The combination, substantially as herein set forth, of a working-chamber, a series or group of main-line conduits connected therewith, closed test-boxes which permit access to the wires located out of the line of the conduit, and closed continuations of the conduits or transfer-pipes connecting with the closed boxes.

In testimony whereof I have hereunto subscribed my name.

JOHN A. BARRETT.

Witnesses:
WALTER N. WALKER,
WILLARD L. CANDEE.